United States Patent [19]

Segal

[11] Patent Number: 5,737,404
[45] Date of Patent: Apr. 7, 1998

[54] DISTRIBUTED SIGNALING SYSTEM SEVEN CALL HANDLING SYSTEM

[75] Inventor: Niranjan Nath Segal, Arlington, Tex.

[73] Assignee: Motorola, Inc., Schaumburg, Ill.

[21] Appl. No.: 627,540

[22] Filed: Apr. 4, 1996

[51] Int. Cl.$^6$ .................. H04M 7/06; H04J 3/14
[52] U.S. Cl. .................. 379/230; 379/207; 379/269; 379/279; 370/217; 370/410; 370/469
[58] Field of Search .................. 379/230, 231, 379/232, 233, 234, 269, 207, 201, 279; 370/93, 469, 410, 524, 264, 229, 522, 217, 409, 396, 219; 395/182.08, 182.09; 364/242.95, 284.4, 240.8

[56] References Cited

U.S. PATENT DOCUMENTS

| | | | |
|---|---|---|---|
| 5,142,528 | 8/1992 | Kobayashi et al. | 370/469 |
| 5,150,405 | 9/1992 | Lee et al. | 379/230 |
| 5,159,594 | 10/1992 | Bales et al. | 370/409 |
| 5,163,055 | 11/1992 | Lee et al. | 371/32 |
| 5,187,708 | 2/1993 | Nakatani et al. | 370/469 |
| 5,386,412 | 1/1995 | Park et al. | 370/270 |
| 5,408,464 | 4/1995 | Jurkevich | 370/219 |
| 5,408,661 | 4/1995 | Kuranaga | 395/650 |
| 5,490,251 | 2/1996 | Clark et al. | 395/200.2 |
| 5,495,485 | 2/1996 | Hughes-Hartogs | 370/524 |
| 5,583,914 | 12/1996 | Chang et al. | 379/58 |
| 5,586,177 | 12/1996 | Farris et al. | 379/230 |
| 5,588,121 | 12/1996 | Reddin et al. | 395/200.15 |
| 5,590,285 | 12/1996 | Krause et al. | 395/200.2 |
| 5,619,645 | 4/1997 | Montenegro et al. | 395/185.01 |
| 5,619,650 | 4/1997 | Bach et al. | 395/200.01 |
| 5,627,829 | 5/1997 | Gleeson et al. | 370/230 |

OTHER PUBLICATIONS

"Telecommunication Technology Handbook", by Daniel Minoli, 1991, Artec House, pp. 426-438, Library of Congress Catalog Card Number 90-26023.

Primary Examiner—Krista Zele
Assistant Examiner—Scott Wolinsky
Attorney, Agent, or Firm—James A. Lamb

[57] ABSTRACT

A distributed signaling system seven (SS7) call handling system (107) includes an SS7 message transport protocol level three (MTPL3) processing module (202), an SS7 message transport protocol lower level (MTPLL) processing module (258), and a local interconnection media (240). The SS7 MTPL3 processing module (202) includes an SS7 MTPL3 network layer (204) and an MTPL3 local network interface (218). The SS7 MTPLL processing module (258) includes an SS7 message transport protocol level one (MTPL1) physical layer (259), an SS7 message transport protocol level two (MTPL2) link layer (256), and an MTPLL local network interface (254). The local interconnection media (240), for example an Ethernet, couples the MTPL3 local network interface (218) to the MTPLL local network interface (254).

15 Claims, 5 Drawing Sheets

DISTRIBUTED SIGNALING SYSTEM SEVEN CALL HANDLING SYSTEM

FIELD OF THE INVENTION

This invention relates in general to telephone networks and in particular to networks employing Signaling System Number 7 Common Channel Signaling.

BACKGROUND OF THE INVENTION

Common channel signaling (CCS) systems are used in telephone networks to improve their efficiency in handling telephone traffic. CCS is a method of controlling telephone networks using a single channel to convey information between telephone exchanges relating to call setup and call supervision of calls being connected on other channels, as well as transmission physicality maintenance and management. The CCS systems are implemented with a great deal of redundancy to ensure reliable signaling communication in the event of transmission physicality failure. In the case of digital signaling transmission, typically one channel of a minimum of four different inter exchange physical circuits are used to convey CCS information between exchanges. The four circuits are typically routed by a minimum of two different physical paths and often these paths are routed through remote exchanges or Signal Transfer Points, allowing for alternate routing in the event of interruption of service due to equipment failure or physical damage.

Signaling System Number 7 (SS7) provides an international standard for CCS systems that is suitable for telephone exchanges, PBXs and Wireless Messaging Gateway™ (WMG)™ messaging terminals, manufactured by Motorola, Inc. of Schaumburg, Ill. In its implementation, SS7 follows the lower three layers of the OSI seven layer model. Only the definition of the lower three layers of the OSI model was completed at the time SS7 was initially developed. The SS7 user part (including the user interface), encompasses the upper four layers of the OSI model.

The SS7 message transport protocol level one (MTPL1) is the lowest, physical layer. The MTPL1 includes the electrical interface to the network and controls the data signal timing and electrical characteristics. In the SS7 case these functions conform to the requirements of the inter exchange digital transmission channel and are typically a part of the digital channel interface.

The SS7 message transport protocol level two (MTPL2) is the link layer. The MTPL2 includes the link control functions, such as delineation of signal units, packets, by flags, error detection and correction, detection of signal link failure and signaling link recovery procedures.

The SS7 message transport protocol level three (MTPL3) is the network layer. Functions including in the MTPL3 are the direction of a message to the proper routes, the even distribution of the packets over the redundant routes, the sending and receiving of information regarding network status, and the control of network configuration to preserve or restore normal message transfer capability.

The architecture of existing SS7 systems relies on a centralized highly complex fault tolerant processing system employing complex software algorithms to provide the MTPL2 and the MTPL3 layers, and the fault tolerance for the MPTL3 layers. These architectures are highly integrated and closely coupled with the message transport protocol (MTP) lower level interfaces and tend to be very difficult to expand. Therefore they must be carefully sized to avoid a large initial cost for signaling systems of small or medium size while at the same time providing some capacity for growth. However, when the capacity is exceeded, the system typically must be essentially completely replaced with one having a larger capacity. What is needed is an easily expandable modular distributed architecture that includes a simple method of providing MTPL3 level redundancy.

DETAILED DESCRIPTION OF THE DRAWINGS

Figure 1:
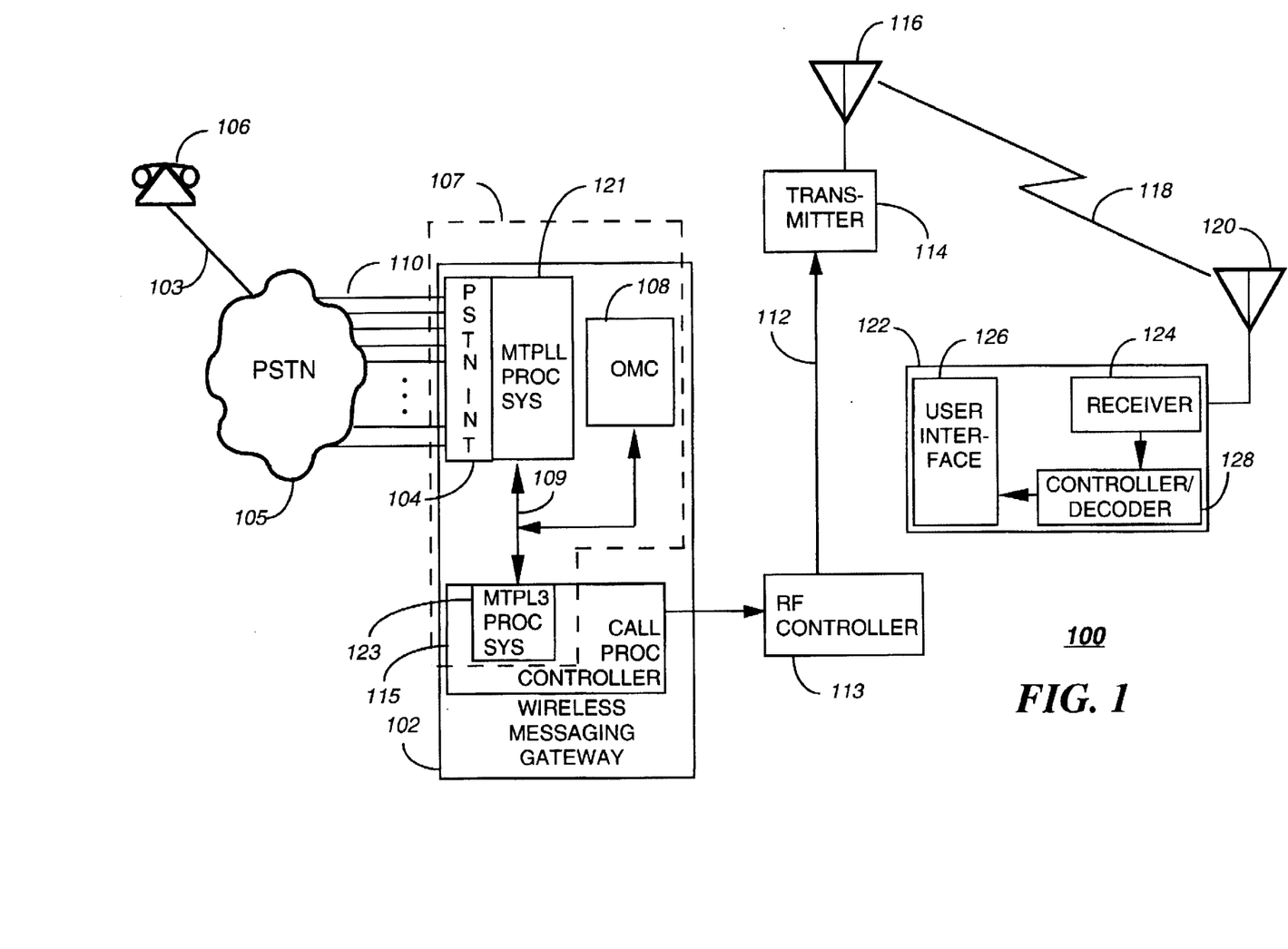
FIG. 1 is an electrical block diagram of a radio communication system, in accordance with the preferred embodiment of the present invention.

Referring to FIG. 1, an electrical block diagram of a radio communication system 100, is shown, in accordance with the preferred embodiment of the present invention. In this example, the radio communication system 100 is shown as a one way Wireless Messaging System, such as a one way paging system. However, it will be appreciated that the radio communication system 100 can alternatively be a two way Wireless Messaging system, such as a two way paging system or a two way cellular or conventional mobile radio system. The radio communication system 100 comprises a message input device, such as a telephone 106, connected to a public switched telephone network (PSTN) 105 by a telephone link 103. The PSTN 105 is coupled to a wireless messaging gateway (WMG) 102 via telephone links 110. The WMG 102 is coupled to a radio frequency (RF) controller 113 that is coupled to a radio frequency transmitter 114 via a communication link 112. A base station antenna 116 is coupled to the transmitter 114. The radio frequency transmitter 114 is in turn coupled to a subscriber unit 122 via the base station antenna 116, a radio frequency signal 118, and a subscriber antenna 120 that is coupled to the subscriber unit 122. Although the embodiment of the present invention is shown in a WMG 102 it will be appreciated that the present invention can be utilized in other equipment as well, for example a telephone exchange, telephone remote switching equipment and a private branch exchange. In accordance with the preferred embodiment of the present invention, the telephone links 110 utilize common channel signaling (CCS) and signaling system 7 (SS7) protocol.

The WMG 102 comprises a PSTN interface 104, a message transport protocol lower level (MTPLL) processing system 121, a call processing controller 115, and an operation and maintenance controller (OMC) 108. The call processing controller 115 comprises a message transport protocol level 3 (MTPL3) processing system 123 and other functions. A distributed SS7 call handling system 107, which comprises the PSTN interface 104, the MTPLL processing system 121, the MTPL3 processing system 123, and the OMC 108, is described in more detail with reference to FIG. 2. The telephone links 110 couple to the PSTN interface 104. Each of the telephone links 110 is preferably either a US T1 circuit (having 24 channels each conveying 64 Kbits/second of binary information, such as digitally encoded voice and a common channel signal) or a European E1 circuit (32 channels each conveying 64 Kbits/second of binary information and a common channel signal). The PSTN interface 104 provides electrical termination for the T1 or E1 trunk and couples the common channel signaling (CCS) information to the MTPLL processing system 121. The MTPLL processing system 121 provides SS7 CCS lower level (level 1 and level 2) processing functions, and couples the lower level processed information to the MTPL3 processing system 123, over a high speed local area network 109, which is preferably an Ethernet local area network. The Ethernet 109 also intercouples the MTPLL to the OMC and the OMC to the call processing controller 115. The call processing controller 115 is also coupled to the RF controller 113. The MTPL3 processing system 123 functions to reconstruct messages coupled over the non-CCS channels, and provides information relating to call setup and call supervision which the call processing controller 115 uses to provide conventional messaging functions described below. The functions provided by the are conventional programmed functions for routing wireless messages received by the PSTN 105 to the subscriber units 122. The call processing controller 115 comprises conventional computer system hardware, preferably a plurality of processors such as VME SPARC™ model 10/20 central processing units (CPUs) manufactured by Themis Computer of Fremont, Calif.; one or more mass storage units such as conventional hard disk drives; one or more conventional Ethernet and/or Fiber Digital Data Interfaces (FDDI), and appropriate conventional cabinetry and power supplies. A Solaris™ Operating System, which is distributed by Sun Microsystems, Inc. of Mountain View, Calif. is preferably used for controlling the programmed functions of the call processing controller 115.

The OMC 108 provides operational and maintenance control of the WMG 102 during system setup and while the system is running. The OMC 108 also acquires system statistics, failure reports, and alarms from the system elements. The OMC 108 is a programmed function that preferably runs on a SPARC™ 10/20 CPU, running under a Solaris™ Operating System. The OMC 108 function includes unique aspects described below with respect to FIG. 5, as well as conventional functions such as standard communication, statistical, and user interface functions.

The WMG 102 oversees the operation of one or more radio frequency transmitters 114, through one or more communication links 112. The communication links 112 are typically twisted pair telephone wires, but can also be RF, microwave, or other communication links. The radio frequency transmitter 114 is coupled to the base station antenna 116. It will be appreciated, that in order to meet the requirements of different systems, the radio frequency transmitter 114 may or may not be collocated with the WMG 102.

The subscriber unit 122 is, by way of example, a selective call receiver. The subscriber unit 122 comprises the radio frequency receiver 124 coupled to a subscriber antenna 120. The radio frequency receiver 124 is coupled to a controller/ decoder 128 that is in turn coupled to a user interface 126. The user interface 126 provides the interface between the user and the subscriber unit 122. The user interface 126 comprises buttons and other controls for the user to enter commands and messages to the controller/decoder 128. The user interface may further comprise alerting devices, such as an alert tone generator, a light emitting diode (LED) indicator, and/or a graphic display to alert the user of pertinent information, and amplifiers and transducer devices to convey voice information to the user.

A paging system user communicating a message to a subscriber unit 122 initiates, by way of example, the communication using the telephone 106. Upon entering the appropriate digits, the user is coupled to the WMG 102 via the telephone link 103, PSTN 105 and telephone links 110. The WMG 102 under control of the call processing controller 115 then prompts the user to enter a message. It will be appreciated that the message can be, for example a numeric message, alpha numeric message or a voice message. When the message is received the call processing controller 115 determines from a subscriber data base (not shown) whether the subscriber unit 122 designated in the message is active in the wireless message system. When the subscriber unit 122 is determined to be active, the call processing controller 115 determines the system identification number (ID) of the subscriber unit 122, includes the system ID in the message and couples the message to the RF controller 113, where it is placed in a queue. At an appropriate time the RF controller 113 encodes the message in a conventional manner and the encoded message is forwarded to the radio frequency transmitter 114 via the communication links 112 for transmission. The encoded message is conveyed from the radio frequency transmitter 114 to the radio frequency receiver 124 in the subscriber unit 122 via the radio frequency signal 118 using the base station antenna 116 and the subscriber antenna 120. The radio frequency receiver 124 couples the encoded message to the controller/decoder 128 which decodes the message, stores the message and alerts the user of the subscriber unit 122 using the user interface 126. The user of the subscriber unit 122 then enters a request for the controller/decoder 128 to convey the message to the user, using the user interface 126. The controller/decoder 128 then presents the message in a suitable manner, for example, using an alpha numeric display for an alpha numeric message.

Figure 2:
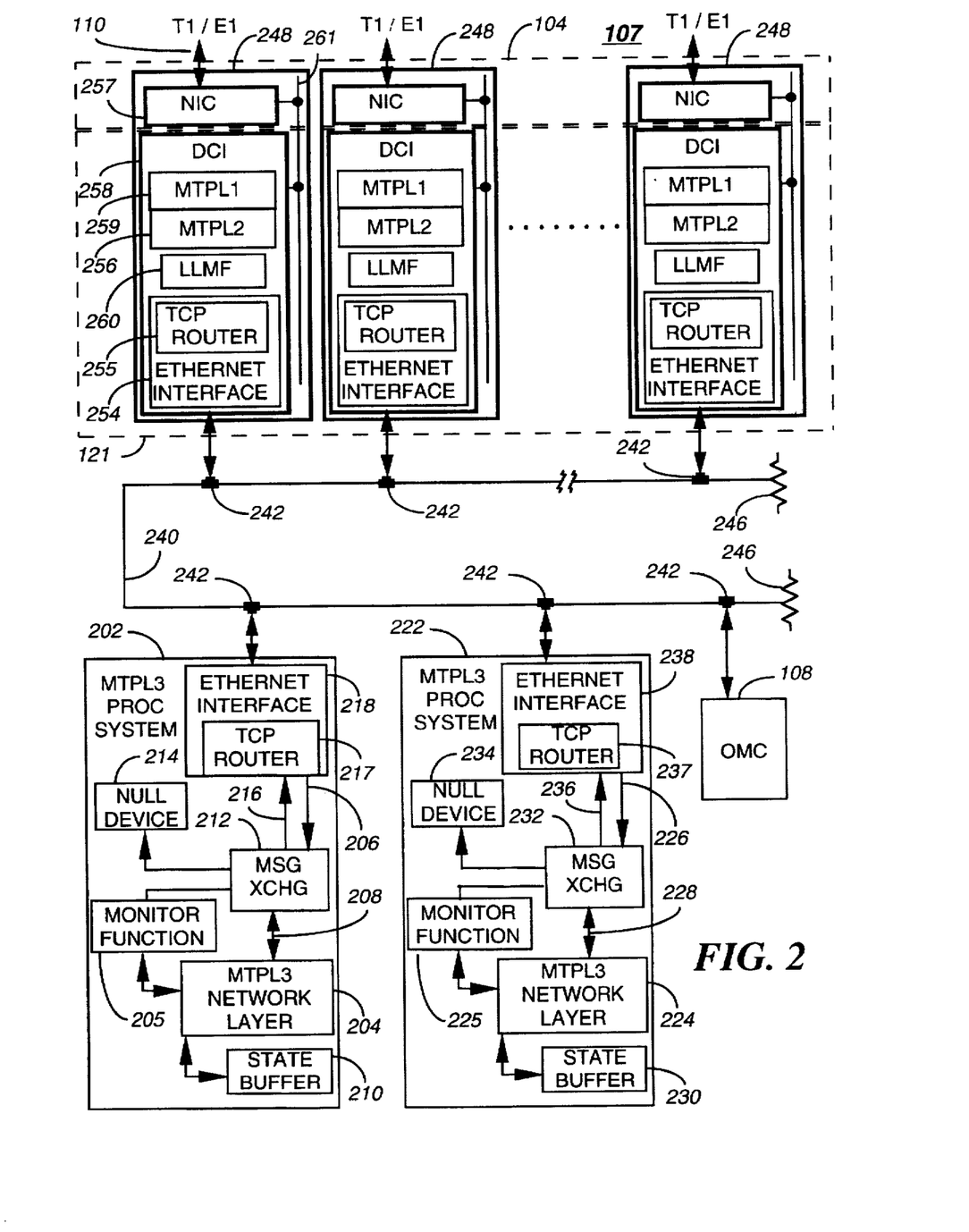
FIG. 2 is an electrical block diagram of a distributed signaling system 7 call handling system, which is a portion of the radio communication system shown in FIG. 1, in accordance with the preferred embodiment of the present invention.

Referring to FIG. 2, an electrical block diagram of the distributed SS7 call handling system 107 is shown, in accordance with the preferred embodiment of the present invention. The distributed SS7 call handling system 107 comprises one or more universal communication controllers (UCC) 248, one or more MTPL3 processing modules 202, 222 and the OMC 108 coupled to each other through the expandable local network 109, which in this example is an Ethernet 240, via network taps 242. Each end of the Ethernet 240 is terminated by a network terminator 246. Each UCC 248 comprises a network interface controller (NIC) 257 and a digital channel interface (DCI) 258, which is alternatively called an MTPLL module. Each NIC 257 is preferably coupled to one of the T1 or the E1 trunk lines 110. In accordance with the preferred embodiment of the present invention, a maximum of one 64 Kbit/second channel of each T1 or E1 trunk is used as a CCS channel. The PSTN interface 104 comprises the one or more NIC 257 which are coupled to the telephone links 110. The MTPLL processing system 121 comprises the one or more DCI 258. The MTPL3 processing system 123 comprises the one or more MTPL3 processing modules 202, 222. Preferably the MTPL3 processing module 202 and the MTPL3 processing module 222 are identical in construction and software content, differing only in their local network address and their operational active/standby status. The distributed SS7 call handling system 107 thus can comprise as few a one DCI 258 and one MTPL3 processing module 202. The distributed SS7 call handling system 107 can be expanded as needed to accommodate more T1 or E1 trunks by adding more DCI 258 without having to include additional MTPL3 modules. An additional MTPL3 module 222 is preferably included in the distributed SS7 call handling system 107 to provide fully redundant backup operation. Additional MTPL3 modules (not shown) can be added for more redundancy. Preferably only one of the MTPL3 processing modules 202, 222 will have an active status at any one time. Thus, the distributed SS7 call handling system 107 is a unique distributed and robust system for handling the information in the CCS channel, using an architecture which is easily expandable, and which provides redundancy without complex or costly software or hardware.

Each UCC 248 preferably comprises one NIC 257 and one data channel interface (DCI) 258. The NIC 257 and the DCI 258 are coupled to each other by a conventional pulse code modulation (PCM) bus 261, such as the signal computing (SC) bus, well known to one of ordinary skill in the art, for conveying the CCS information from the NIC 257 to the DCI 258. The PCM bus 261 carries all the digitized channels of the T1 or E1 trunk to other modules in the UCC 248 for use by other functions (not shown). The PCM bus 261 of each DCI 258 is preferably interconnected with the PCM bus 261 of the other DCI's, allowing routing of the digitized voice messages to any of the NIC's 257, and thereby to any of the T1/D1 trunks.

Each DCI 258 comprises a message transport protocol level 1 (MTPL1) 259 function, a message transport protocol level 2 (MTPL2) 256 function, a lower level monitor function 260, and an Ethernet interface 254, also called a lower level network interface 254. The Ethernet interface 254 comprises a conventional TCP router 255 for controlling the routing of message segments passed over the Ethernet 240. The Ethernet interface 254 is coupled to the Ethernet 240.

Each UCC 248 preferably comprises a conventional rack mounted PC chassis providing power for the NIC 257 and DCI 258. The NIC 257 is a conventional PC™ compatible computer module manufactured by Dialogic, of Parsippany, N.J. The DCI 258 is a preferably a PC™ compatible printed circuit board module based on the SDB2 module, part number 72178G06 manufactured by Motorola, Inc. of Schaumburg, Ill.. The SDB2 module uses a unique combination of a 68360 model processor manufactured by Motorola, Inc. of Schaumburg, Ill. and an Ethernet transceiver integrated circuit (IC) (commonly available from several manufacturers) interconnected with conventional computer components such as random access memory (RAM) and read only memory (ROM). The SDB2 module has been designed to have a PCM bus structure compatible with the serial communication bus of the Network Interface Controller. The message transport protocol level one physical layer (MTPL1) 259 and the message transport protocol level two link layer (MTPL2) 256 are conventional programmed functions running on the 68360 processor, preferably under a VxWORKS™ operating system (OS). The VxWORKS™ OS is distributed by Wind River Systems of Alameda, Calif.. The TCP router 255 function is provided by a conventional TCP/IP built-in stack also running on the 68360 under the VxWORKS™ OS, and which controls the Ethernet transceiver IC. The lower level monitor function (LLMF) 260 is a unique software function running on the 68360 under the VxWORKS™ OS, and which provides unique functions described below with reference to FIG. 3.

The MTPL3 module 202 comprises an Ethernet interface 218, also called a level three network interface, an SS7 MTPL3 network layer 204, a state buffer 210, a message exchange 212, a monitor function 205, and a null device 214. The Ethernet interface 218 includes a TCP router 217. An output 206 of the Ethernet interface 218 is coupled to the message exchange 212. An input/output 208 of the MTPL3 network layer 204 is coupled to the message exchange 212 which in turn is coupled to the input 216 of the Ethernet interface 218. The message exchange 212 is also coupled to a null device 214. The monitor function 205 is coupled to the MTPL3 network layer 204 and to the message exchange 212. The state buffer 210 is coupled to the MTPL3 network layer 204.

The MTPL3 module 222 comprises an Ethernet interface 238, an SS7 MTPL3 network layer 224, a state buffer 230, a message exchange 232, a monitor function 225, and a null device 234. The Ethernet interface 238 includes a TCP router 237. An output 226 of the Ethernet interface 238 is coupled to the message exchange 232. An input/output 228 of the MTPL3 network layer 224 is coupled to the message exchange 232 which in turn is coupled to the input 236 of the Ethernet interface 238. The message exchange 232 is also coupled to a null device 234. The monitor function 225 is coupled to the MTPL3 network layer 224 and to the message exchange 232. The state buffer 230 is coupled to the MTPL3 network layer 224.

Figure 4:
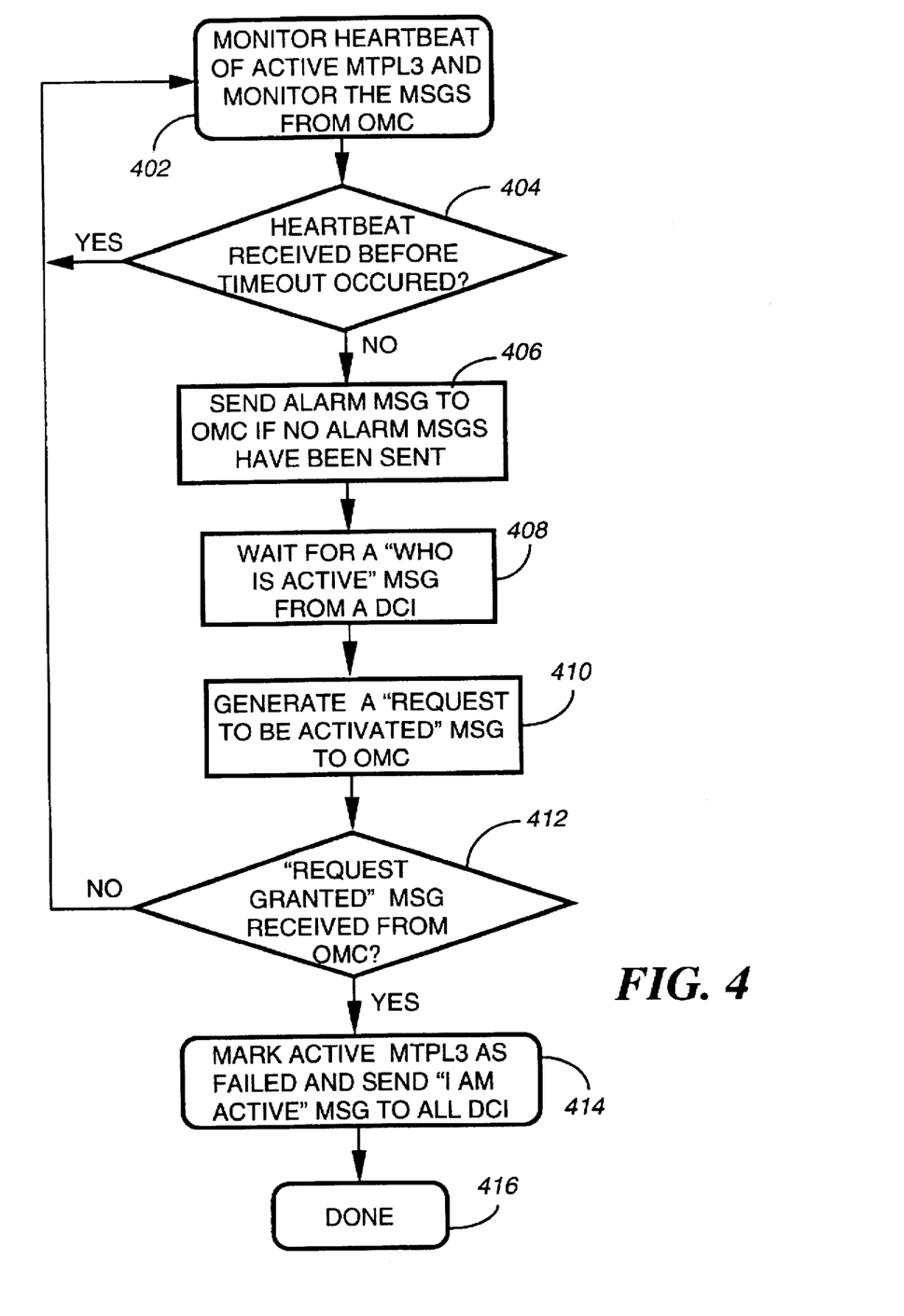
FIG. 4 is a flow chart describing the operation of an upper level monitor function used in the distributed SS7 call handling system shown in FIG. 2, in accordance with the preferred embodiment of the present invention.

The two modules 202, 222 are comprised of identical hardware components and software functions. Each of the MTPL3 processing modules 202, 222 is preferably an identical VME computer module, model CPU162 manufactured by Motorola, Inc. which includes an Ethernet transceiver IC and a conventional VxWORKS™ OS running on a 68040 model processor manufactured by Motorola, Inc. of Schaumburg, Ill.. Each of the message transport protocol level three network layers (MTPL3) 204, 224 is a conventional programmed function running under the VxWORKS™ OS on the 68040 processor. Each of the TCP router functions 217, 237 is provided by a conventional TCP/IP built-in stack also running on the 68040 processor under the VxWORKS™ OS, and which controls the Ethernet transceiver IC. The identical monitor functions 205, 225 and the identical message exchange functions 212, 232 are unique software functions which run on the 68360 under the VxWORKS™ OS. The message exchange functions 212, 232 are described below with reference to FIG. 2. Portions of the monitor functions 205, 225, which are specific to operation in an MTPL3 that is in the standby state, are described below with reference to FIG. 4. A feature of the monitor function 205, 225 not shown in FIG. 4 is the generation of a repetitive heartbeat message that is addressed to the OMC 108 and all other MTPL3 modules in the distriubuted SS7 call handling system, which in this example are MTPL3 202 and MTPL3 222. The repetitive heartbeat message is generated whether the MTPL3 is operating in the active or standby state. The state buffer 210 is preferably a RAM memory for storing variables which define essentially the complete operational state of each MTPL3 processing modules 202, 222. The null device 214 is a simple function for accepting messages from the message exchange and discarding them.

It will be appreciated that the local network 240 can be of an alternative type, such as FDDI, in which case a different transceiver IC and correspondingly different software is used in both of the Ethernet interfaces 254, 218.

For the purpose of explanation, the distributed SS7 call handling system 107 is initialized in the following states.

The MTPL3 processing module 202 is initially in an active state, the MTPL3 processing module 222 is in a standby state, and telephone links 110 connect with a distant telephone switching center that is exchanging information utilizing one or more CCS channels. Message exchange 212 of the active MTPL3 processing module 202 is in the active state with the output 208 of MTPL3 network layer 204 coupled to the Ethernet interface 218. Message exchange 232 of the standby MTPL3 processing module 222 is in the standby state with the output 228 of MTPL3 network layer 224 coupled to the null device 234. Initially state buffer 210 will contain the same information as state buffer 230.

An incoming SS7 message from a distant switching center, for example, a message to alert the WMG 102 that a voice link is to be established with a paging system user using a specific channel of a specific telephone link of the telephone links 110 arrives on one of the CCS channels. This message is communicated using a packet format. The packets are received by the MTPL1 259 wherein the level one protocol functions are performed and the packets are forwarded to the MTPL2 256. The level two protocol functions are performed on the packets and the packets are addressed by TCP router 255 and transmitted to the active MTPL3 processing module 202 via the Ethernet interface 254, and Ethernet 240. The TCP router 255 maintains a routing table that contains a primary address, which in this example is the active MTPL3 202, and at least one secondary address, which in this example is MTPL3 222. The updating of the routing table will be described below in reference to FIGS. 3, 4 and 5. The packets are received by the Ethernet interface 218 of the active MTPL3 processing module 202 and transferred through the message exchange 212 to the MTPL3 network layer 204. The packets are assembled into an SS7 CCS message by the MTPL3 network layer 204 and coupled via the Ethernet 240 to the call processor controller 115 (not shown in FIG. 2). The call processing controller 115 uses the CCS message for determining where to route the voice messages being received on the channels of the T1/E1 trunks. The message exchange 212, which is operating in its active state (corresponding to the active state of the MTPL3), duplicates the CCS message and forwards the duplicated CCS message to the standby MTPL3 processing module 222 via the Ethernet interface 218 and the Ethernet 240. It will be appreciated that, more generally, the message exchange 212 in the active MTPL3 also duplicates all CCS messages received from the MTPLL processing system 121 and all CCS messages from the call processing controller 115 and forwards them to the standby MTPL3. The message exchange 212 analyzes the messages received and routes each to its proper destination, such as the OMC 108, or one of the DCI's 258 in the MTPLL processing system 121.

The standby MTPL3 processing module 222 receives the reassembled message forwarded by the message exchange 212 and processes the reassembled message in the same manner as the active MTPL3 processing module 202. The message exchange 232 in the standby MTPL3 processing module is operating in its standby state. Messages received by the message exchange 232 which are destined to the MTPLL processing system 121 or the call processing controller 115 are coupled to the null device 234. The null device 234 provides all of the necessary functions, for example hand shakes, for the MTPL3 network layer 224 to complete a normal message hand-off process. Messages received by the null device 234 are discarded. This allows the use of a conventional MTPL3 network layer function. Other messages received by the message exchange 232, such as heartbeat messages from the active MTPL3 processing module 202 are routed to the monitor function 225. The monitor function also generates some system status messages, such as a request to become the active MTPL3 processing module, which are routed by the message exchange 232 to the OMC or the active MTPL3 processing module. Operating the standby MTPL3 processing module 222 in this manner assures that standby MTPL3 processing module 222 is fully mirroring the operations of the active MTPL3 processing module 202 and is able to assume the active status in the event of the failure of the currently active MTPL3 processing module 202.

Outgoing SS7 messages originated by the call processing controller 115 are coupled to the Ethernet interface 218 of the active MTPL3 processing module 202 via the Ethernet 240. The MTPL3 processing module 202 performs the level three protocol functions and routes the message to the designated MTPLL module (or DCI) 258. The message exchange 212 that is part of the active MTPL3 network layer 204 duplicates and forwards the SS7 message to the standby MTPL3 processing module 222. The standby MTPL3 processing module 222 processes the SS7 message the same way the active MTPL3 processing module 202 processes the SS7 message, however all output is diverted to the null device 234.

Figure 3:
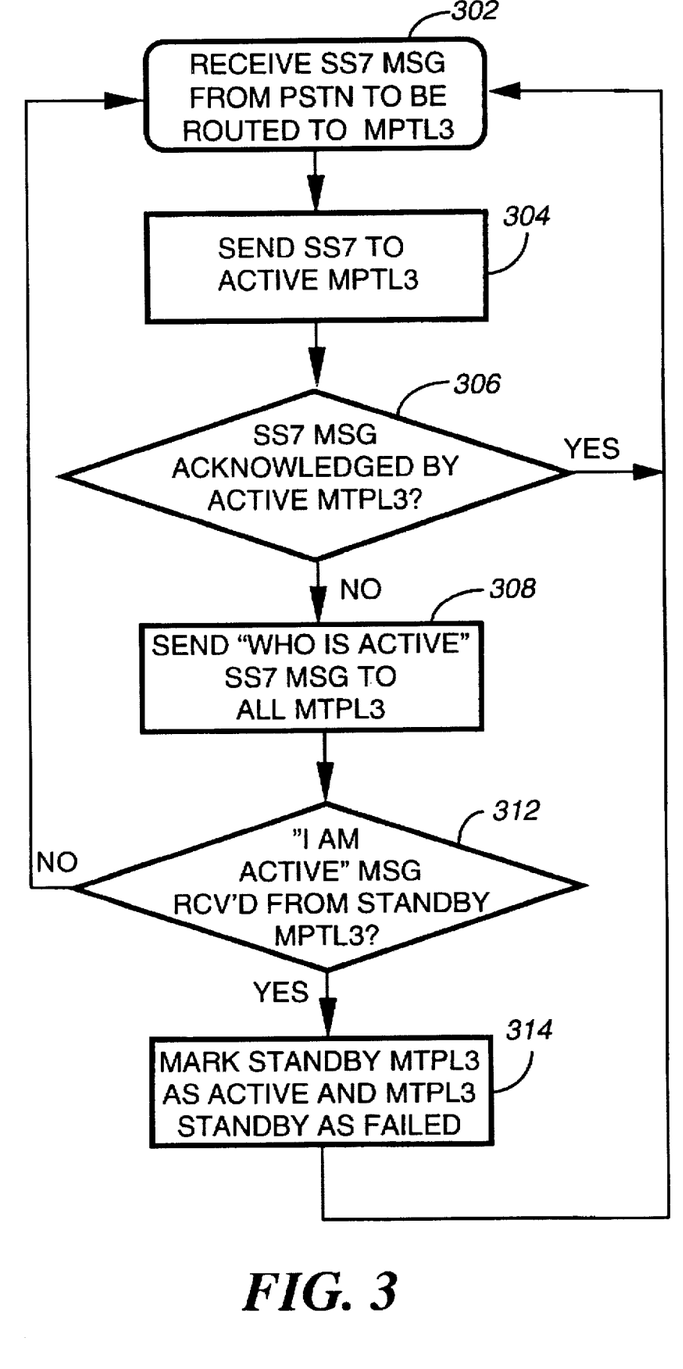
FIG. 3 is a flow chart describing the operation of a lower level monitor function and portions of other functions used in the distributed signaling system 7 call handling system shown FIG. 2, in accordance with the preferred embodiment of the present invention.

Referring to FIG. 3, a flow chart is shown which describes the operation of the lower level monitor function (LLMF) 260 and portions of other functions in the MTPLL module (or DCI) 258 when delivering messages to a MTPL3 processing module 202, in accordance with the preferred embodiment of the present invention. In this example, the MTPL3 processing module 202 starts off as the active unit and the MTPL3 processing module 222 is passive. At step 302 an SS7 message is received from the NIC 257 which is to be routed to the MTPL3 processing module 202. Then, at step 304 the TCP router 255 attempts to send the message to the active MTPL3 202, as determined from the routing table in the TCP. When at step 306 an acknowledgment is received from the active MTPL3 processing module 202 indicating the successful transmission of the message, the process continues at step 302, waiting for the next received message. When at step 306 an acknowledgment is not received the monitor function reacts by generating a "who is active" SS7 message which is packaged for transmission to all MTPL3 in the WMG 102 by the router 255, and transmitted by the Ethernet interface 254 at step 308. When an "I am active" message is received from the MTPL3 processing module 222 at step 312, the MTPL3 processing module 222 is marked as active and the MTPL3 processing module 202 is marked as failed at step 314 by a change of the primary and secondary addresses in the routing table. The process continues at step 304 with another attempt to send the SS7 message to the newly active MTPL3 processing module. When an "I am active" message is not received from the MTPL3 processing module 222 within a predetermined time at step 312, the process continues at step 302 by waiting for a next received message.

Referring to FIG. 4, a flow chart is shown describing the operation of the monitor function 225 in the standby MTPL3 message processing module 222, in accordance with the preferred embodiment of the present invention. The monitor function 225 tests for the periodic receipt of a heartbeat message generated by the active MTPL3 message processing module 202. The monitor function attempts to make MTPL3 222 the active MTPL3 when heartbeats are not received as expected from MTPL3 202. At step 402, received messages are monitored to determine the receipt of heartbeat messages from the active MTPL3 message processing module 202 or for messages from the OMC 108. When a heartbeat message is received at step 404 before a predetermined time-out occurs, the timer is reset and the monitor awaits the next heartbeat message at step 402. When a heartbeat message is not received before the time-out occurs at step 404, the monitor generates an alarm message at step 406 which is sent to the OMC, when no previous alarm message has been sent within a predetermined time. At step 408, the monitor function 225 awaits a "who is active" message from any DCI 258. When a "who is active" message is received, the monitor function 225 generates a "request to become active" message at step 410, which is routed to the OMC 108 by the TCP router 217. When, at step 412, a "request granted" message is received from the OMC 108, the MTPL3 222 marks the MTPL3 202 at step 414 as being failed and the monitor function generates an "I am active" message at step 414 which is routed to all DCI 258 by the TCP router 217. The method is complete at step 416, with the MTPL3 now in the active state. When the "request granted" message is not received from the OMC 108 within a predetermined time, the method continues at step 402, again monitoring for a heartbeat message.

Figure 5:
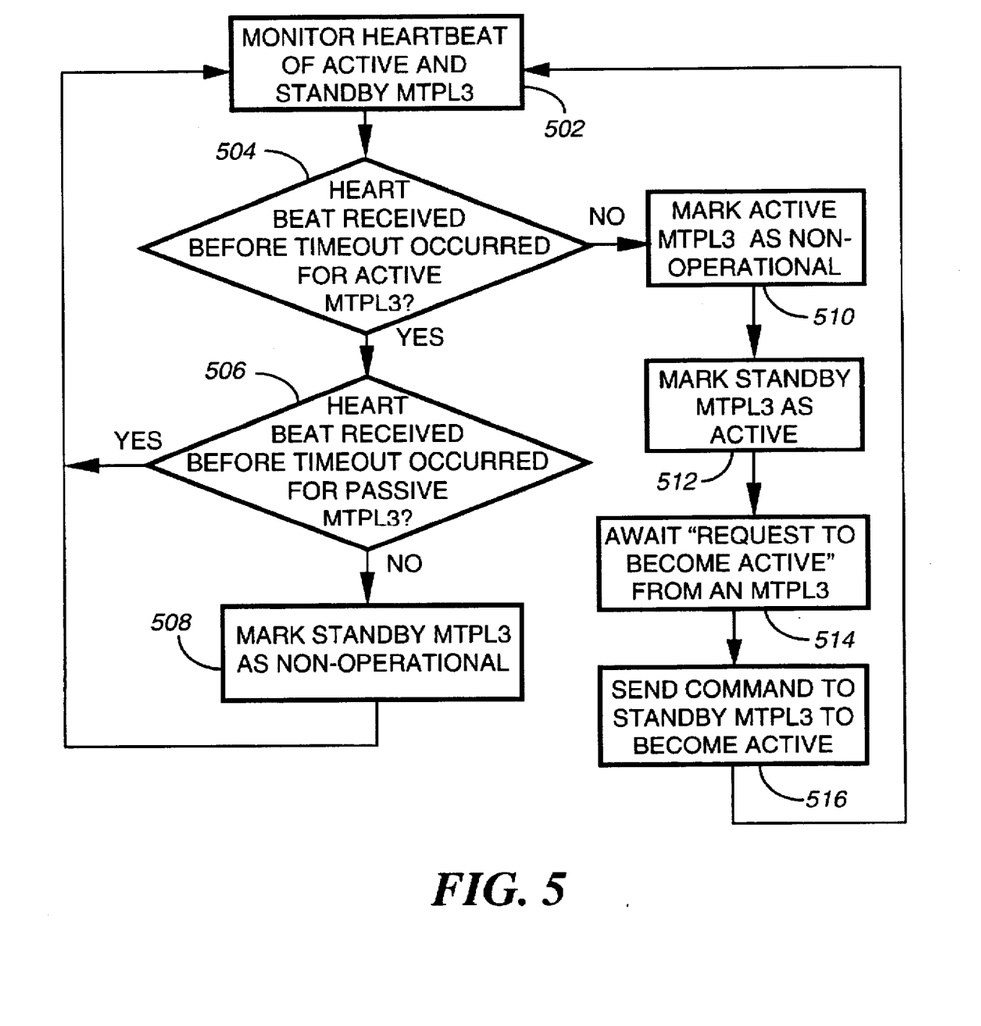
FIG. 5 is a flow chart describing the operation of an operation and maintenance function used in the distributed SS7 call handling system shown in FIG. 2, in accordance with the preferred embodiment of the present invention.

Referring to FIG. 5, a flow chart is shown describing a monitor process performed by the OMC 108, in accordance with the preferred embodiment of the present invention. The monitor process in the OMC 108, operating in cooperation with the monitor functions 205, 225 in the MTPL3 message processing modules 202, 222 ensures a "hot switch over" from the active to the passive MTPL3 message processing system in the event of a failure in the active unit, because the states of each MTPL3, which are kept in the state buffers 210, 230, are maintained essentially equivalent by the duplication of message traffic to both MTPL3's 202, 222. Thus, when a switch over occurs, it is "hot" in the sense that essentially no message traffic is lost. At step 502, the OMC monitor process monitors heartbeat messages from the active MTPL3 202 and standby MTPL3 222. When a heartbeat message is received from the active MTPL3 202 before a first predetermined time-out expires at step 504 and a heartbeat message is received from the active MTPL3 202 before a second predetermined time-out expires at step 506, the method continues at step 502 with continued monitoring of heartbeats. When a heartbeat message is not received from the active MTPL3 202 before a first predetermined time-out expires at step 504, the OMC monitor process marks the active MTPL3 202 as non-operational at step 510 and marks the standby MTPL3 222 as active at step 512. At step 514 the monitor process awaits a "request to become active" from the MTPL3 222 and when it is received, sends a "request granted" message at step 516 to the standby MTPL3 222 to become the active MTPL3 222.

When a heartbeat message is received from the active MTPL3 202 before a first predetermined time-out expires at step 504 and a heartbeat message is not received from the active MTPL3 202 before a second predetermined time-out expires at step 506, the OMC monitor process marks the standby MTPL3 as non-operational at step 508.

It will be appreciated that alternative processor hardware and operating systems could be used to provide the functions described herein, although perhaps being more costly.

In summary, the distributed SS7 call handling system 107 described above includes an SS7 message transport protocol level three (MTPL3) processing module 202, an SS7 message transport protocol lower level (MTPLL) processing module 258, and a local interconnection media 240.

The SS7 message transport protocol level three (MTPL3) processing module 202 includes an SS7 MTPL3 network layer 204, and a level three local network interface 218, which is coupled to the SS7 MTPL3 network layer 204. The SS7 message transport protocol lower level (MTPLL) processing module 258 includes an SS7 message transport protocol level one (MTPL1) physical layer 259, an SS7 message transport protocol level two (MTPL2) link layer 256, which is coupled to the SS7 MTPL1 physical layer 259, and an lower level local network interface 254, which is coupled to the SS7 MTPL2 link layer 256. The local interconnection media 240 couples the level three local network interface 218 to the lower level local network interface 254.

The modular distributed architecture used in the distributed SS7 call handling system 107, which includes a unique division of the software and hardware elements interconnected by an expandable local interconnection media 240, provides a robust redundant SS7 CCS interface, that is easily expanded. A key aspect of the invention is the splitting of the MTPL3 function from the MTPLL functions. The splitting is made possible by adding a network interface to each of them. This splitting provides a unique MTP architecture that is easily expandable in a cost effective manner. Furthermore, with the inclusion of the unique monitor functions described herein, a highly reliable system is provided with minimal duplication of hardware (only the MPTL3 portion needs to be duplicated). The system features hot switch over of the MTPL3 processing modules, bringing the message loss to a minimum when a failure of an MTPL3 processing module occurs.

I claim:

1. A distributed signaling system seven (SS7) call handling system, comprising:
   an SS7 message transport protocol level three (MTPL3) processing module, comprising
   an SS7 MTPL3 network layer, and
   a level three local network interface, coupled to said SS7 MTPL3 network layer;
   an SS7 message transport protocol lower level (MTPLL) processing module, comprising
   an SS7 message transport protocol level one (MTPL1) physical layer,
   an SS7 message transport protocol level two (MTPL2) link layer, coupled to said SS7 MTPL1 physical layer,
   a lower level local network interface, coupled to said SS7 MTPL2 link layer, and
   an MTPLL monitor function coupled to said lower level local network interface, for routing messages to an SS7 MTPL3 processing module identified to be in an active state; and
   a local interconnection media, coupling said level three local network interface to said lower level local network interface.

2. The distributed signaling system seven (SS7) call handling system according to claim 1, comprising a plurality of said SS7 MTPLL processing modules, wherein said local interconnection media couples said lower level local network interface of each of said plurality of said SS7 MTPLL processing modules to said level three local network interface.

3. The distributed signaling system seven (SS7) call handling system according to claim 2, wherein said local interconnection media is an expandable network having a network protocol and said plurality of said SS7 MTPLL processing modules are differentiated by the network protocol.

4. The distributed signaling system seven (SS7) call handling system according to claim 1, wherein said local interconnection media is one of an Ethernet and a Fiber Digital Data Interface (FDDI).

5. The distributed signaling system seven (SS7) call handling system according to claim 1, comprising a plurality of SS7 MTPL3 processing modules and a plurality of SS7 MTPLL processing modules, wherein said local interconnection media couples together said level three local network interface of each of said plurality of SS7 MTPL3 processing modules and further couples said level three local network interface of each of said plurality of SS7 MTPL3 processing modules to said lower level local network interface of each of said plurality of SS7 MTPLL processing modules.

6. The distributed signaling system seven (SS7) call handling system according to claim 5, wherein said local interconnection media is an expandable network having a network protocol and wherein lower level local network interfaces and level three local network interfaces are differentiated by the network protocol.

7. A distributed signaling system seven (SS7) call handling system, comprising:
   an SS7 message transport protocol level three (MTFL3) processing module, comprising
      an SS7 MTPL3 network layer,
      an MTPL3 monitor function coupled to said SS7 MTPL3 network layer for operating said SS7 MTPL3 processing module in one of an active state and a standby state, and
      a level three local network interface, coupled to said SS7 MTPL3 network layer;
   an SS7 message transport protocol lower level (MTPLL) processing module, comprising
      an SS7 message transport protocol level one (MTPL1) physical layer,
      an SS7 message transport protocol level, two (MTPL2) link layer, coupled to said SS7 MTPL1 physical layer, and
      a lower level local network interface, coupled to said SS7 MTPL2 link layer; and
   a local interconnection media coupling said level three local network interface to said lower level local network interface, wherein said MTPL3 monitor function notifies SS7 MTPLL processing modules coupled to said local interconnection media of a change of state of the SS7 MTPL3 processing module to the active state.

8. The distributed signaling system seven (SS7) call handling system according to claim 7, wherein in a system having one or more other SS7 MTPL3 processing modules, said MTPL3 monitor function operates said SS7 MTPL3 processing module in the active state only when all of said one or more other SS7 MTPL3 processing modules are not in the active state, and wherein said MTPL3 monitor function generates a repetitive heartbeat message when said SS7 MTPL3 processing module is operating in one of the active state and standby state, and wherein when said SS7 MTPL3 processing module is in the standby state, said MTPL3 monitor function uses the repetitive heartbeat message generated by the one or more other SS7 MTPL3 processing modules to determine that said SS7 MTPL3 processing module should generate a request to change to the active state.

9. The distributed signaling system seven (SS7) call handling system according to claim 8, wherein said SS7 MTPLL processing module further comprises a lower level monitor function for generating a "who is active" message, and wherein when said SS7 MTPL3 processing module in the standby state, said monitor function generates a message requesting said SS7 MTPL3 processing module to change to the active state when no heartbeat message is received within a predetermined time and the "who is active" message is received.

10. A signaling system seven (SS7) message transport protocol level three (MTPL3) processing module, comprising:
   an SS7 MTPL3 network layer;
   an MTPL3 monitor function, coupled to said SS7 MTPL3 network layer, for operating said SS7 MTPL3 processing module in one of an active state and a backup state; and
   a level three local network interface, coupled to said SS7 MTPL3 network layer, for coupling said SS7 MTPL3 network layer to an SS7 message transport protocol level two (MTPL2) link layer through a local interconnection media.

11. The SS7 message transport protocol level three (MTPL3) processing module according to claim 10, wherein said level three local network interface uses one of an Ethernet interface and a Fiber Digital Data Interface (FDDI) and the local interconnection media is one of an Ethernet and FDDI network.

12. The SS7 message transport protocol level three (MTPL3) processing module according to claim 10, wherein said MTPL3 monitor function notifies SS7 MTPLL processing modules coupled to said local interconnection media of a change of state of the MTPL3 processing module to the active state.

13. The SS7 message transport protocol level three (MTPL3) processing module according to claim 12, wherein in a system having one or more other SS7 MTPL3 processing modules, said MTPL3 monitor function operates said SS7 MTPL3 processing module in the active state only when all of said one or more other SS7 MTPL3 processing modules are not in the active state, and wherein said MTPL3 monitor function generates a repetitive heartbeat message when said SS7 MTPL3 processing module is operating in one of the active state and the standby state, and wherein when said SS7 MTPL3 processing module is in the standby state, said MTPL3 monitor function uses the repetitive heartbeat message generated by the one or more other SS7 MTPL3 processing modules to determine that said SS7 MTPL3 processing modules should generate a request to change to the active state.

14. A signaling system seven (SS7) message transport protocol lower level (MTPLL) processing module, comprising:
   an SS7 message transport protocol level one (MTPL1) physical layer;
   an SS7 message transport protocol level two (MTPL2) link layer, coupled to said SS7 MTPL1 physical layer;
   a lower level local network interface, coupled to said SS7 MTPL2 link layer, for coupling said SS7 MTPL2 link layer to an SS7 message transport protocol level three (MTPL3) network layer through a local interconnection media; and
   an MTPLL monitor function, coupled to said lower level local network interface, for routing messages to an SS7 MTPL3 processing module identified to be in an active state.

15. The SS7 MTPLL processing module according to claim 14, wherein said lower level local network interface uses one of an Ethernet interface and a Fiber Digital Data Interface (FDDI) and the local interconnection media is one of an Ethernet and a FDDI network.

* * * * *